United States Patent
Hontz, Jr.

(10) Patent No.: US 10,642,461 B2
(45) Date of Patent: *May 5, 2020

(54) INTERACTIVE COMPARATIVE DISPLAY OF NEWS INFORMATION

(71) Applicant: Kazark, Inc., Old Saybrook, CT (US)

(72) Inventor: Drue A. Hontz, Jr., Old Saybrook, CT (US)

(73) Assignee: Kazark, Inc., New Haven, CT (US)

(*) Notice: Subject to any disclaimer, the term of this patent is extended or adjusted under 35 U.S.C. 154(b) by 220 days.

This patent is subject to a terminal disclaimer.

(21) Appl. No.: 15/937,469

(22) Filed: Mar. 27, 2018

(65) Prior Publication Data

US 2018/0217738 A1 Aug. 2, 2018

Related U.S. Application Data

(63) Continuation of application No. 14/382,525, filed as application No. PCT/US2013/028222 on Feb. 28, 2013, now Pat. No. 9,946,444.

(Continued)

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0482* (2013.01); *G06F 3/0483* (2013.01);
(Continued)

(58) Field of Classification Search
CPC .. G06F 3/04842; G06F 3/0483; G06F 3/0482; G06F 3/04847; G06F 17/30386;
(Continued)

(56) References Cited

U.S. PATENT DOCUMENTS

| | | |
|---|---|---|
| 5,295,243 A | 3/1994 | Robertson |
| 6,448,987 B1 | 9/2002 | Easty |

(Continued)

FOREIGN PATENT DOCUMENTS

| | | |
|---|---|---|
| CN | 101290618 A | 10/2008 |
| CN | 101604312 A | 12/2009 |

(Continued)

OTHER PUBLICATIONS

Munroe, "Reddit's New Comment Sorting System", URL http://blog.reddit.com/2009/10/reddits-new-comment-sorting-system.html, accessed on Apr. 16, 2013.

(Continued)

*Primary Examiner* — Tadesse Hailu
*Assistant Examiner* — Asteway T Gattew
(74) *Attorney, Agent, or Firm* — Morse, Barnes-Brown & Pendleton, P.C.; Sean D. Detweiler, Esq.

(57) ABSTRACT

A system for a computer implemented interactive comparative display of news information organizes a visual screen display to a user such that the user is able to efficiently select information content, be presented with topical associations relating to that content, and readily compare different information content from a single display. The information content represented by each selectable result indicator is comparable with the information content represented by other selectable result indicators, wherein the information content is of a same type of information content but from a different perspective, vantage point, or provides a different alternative. A user may navigate to a particular segment of information content, and then be presented with a string of topically related segments, as well as with one or more connecting categories of information, which may otherwise not have been readily apparent to the particular selected segment, but for the display system and method.

18 Claims, 7 Drawing Sheets

Related U.S. Application Data (60) Provisional application No. 61/606,148, filed on Mar. 2, 2012.

(51) Int. Cl.
*G06F 16/24* (2019.01)
*G06F 16/904* (2019.01)
*G06F 3/0483* (2013.01)
*G06F 3/0482* (2013.01)

(52) U.S. Cl.
CPC .......... *G06F 3/04847* (2013.01); *G06F 16/24* (2019.01); *G06F 16/904* (2019.01)

(58) Field of Classification Search
CPC ... G06F 17/30994; G06F 16/904; G06F 16/24
See application file for complete search history.

(56) References Cited

U.S. PATENT DOCUMENTS

| | | | |
|---|---|---|---|
| 7,568,148 B1 | 7/2009 | Bharat et al. | |
| 7,660,822 B1 | 2/2010 | Pfleger | |
| 7,908,371 B2 | 3/2011 | Friedman et al. | |
| 8,341,146 B1 | 12/2012 | Bleckner et al. | |
| 8,601,399 B2 | 12/2013 | Hontz, Jr. | |
| 8,880,499 B1 * | 11/2014 | Wu | H04L 67/32 707/710 |
| 9,251,519 B1 * | 2/2016 | Bharat | G06Q 30/02 |
| 9,588,659 B2 | 3/2017 | Hontz, Jr. | |
| 9,946,444 B2 | 4/2018 | Hontz, Jr. | |
| 2003/0037050 A1 | 2/2003 | Monteverde | |
| 2006/0161535 A1 * | 7/2006 | Holbrook | G06Q 40/04 |
| 2007/0061303 A1 | 3/2007 | Ramer et al. | |
| 2007/0179952 A1 | 8/2007 | Vespe et al. | |
| 2007/0244900 A1 | 10/2007 | Hopkins et al. | |
| 2008/0010119 A1 | 1/2008 | Oliveria et al. | |
| 2008/0301112 A1 | 12/2008 | Wu | |
| 2009/0070346 A1 * | 3/2009 | Savona | G06F 16/35 |
| 2009/0171899 A1 | 7/2009 | Chittoor et al. | |
| 2010/0197353 A1 | 8/2010 | Marui et al. | |
| 2012/0005016 A1 | 1/2012 | Graff | |
| 2012/0011475 A1 | 1/2012 | Hontz, Jr. | |
| 2013/0036169 A1 | 2/2013 | Quigley | |

FOREIGN PATENT DOCUMENTS

| | | |
|---|---|---|
| JP | 2007-028462 | 1/2007 |
| JP | 2007-535039 | 11/2007 |
| JP | 2009-245453 | 10/2009 |
| JP | 2011-530138 | 12/2011 |
| RU | 2095857 | 11/1997 |
| RU | 2191482 | 10/2002 |
| WO | WO 2005/106685 A1 | 11/2005 |
| WO | WO 2010/017229 A1 | 2/2010 |
| WO | WO 2011/159408 | 12/2011 |
| WO | WO 2013/130739 | 9/2013 |

OTHER PUBLICATIONS

"Google's +1 button finally becomes useful for sharing content on the web", *The Independent*.
http://web.archive.org/web/20100221215603/http://www.amazon.co.jp/%F3%83%8, accessed on Feb. 19, 2015.
http://web.archive.org/web/20100418194120/http://www.asahi.com/sports/baseball/n . . . , accessed on Feb. 19, 2015.
http://web.archive.org/web/20100413041623/http://www.asahi.com/entertainment, accessed on Feb. 19, 2015.
http://web.archive.org/web/20100413203328/http://www.asahi.com/sports/bb/mlb.html, accessed on Feb. 19, 2015.
International Search Report for International Application No. PCT/US2013/028222, dated May 10, 2013.
Supplementary European Search Report for European Application No. EP 13755044, dated Feb. 18, 2016.
International Search Report for International Application PCT/US2011/35924, dated Aug. 12, 2011.
Non-Final Office Action for U.S. Appl. No. 13/104,539 (listed on SB-08 as US 2012/0011475), dated Sep. 17, 2012.
Notice of Allowance for U.S. Appl. No. 13/104,539 (listed on SB-08 as US 2012/0011475), dated Oct. 15, 2013.
Office Action in U.S. Appl. No. 14/067,229, dated Mar. 11, 2016.
Final Office Action issued in U.S. Appl. No. 14/067,229, dated Sep. 22, 2016.
Notice of Allowance and Fee(s) Due issued in U.S. Appl. No. 14/067,229, dated Oct. 31, 2016.
Non-Final Office Action for U.S. Appl. No. 14/382,525, dated Aug. 26, 2016.
Non-Final Office Action for U.S. Appl. No. 14/382,525, dated Jun. 15, 2017.
Notice of Allowance for U.S. Appl. No. 14/382,525, dated Dec. 28, 2017.
Web Crawler, retrieved from the Internet at https://en.wikipedia.org/w/index.php?title=Web_crawler&oldid=393844410, retrieved on Feb. 20, 2019.

* cited by examiner

INTERACTIVE COMPARATIVE DISPLAY OF NEWS INFORMATION

CROSS-REFERENCE TO RELATED APPLICATION

This application claims priority to, and the benefit of, co-pending U.S. application Ser. No. 14/382,525, filed Sep. 2, 2014, which is a national stage filing under 35 U.S.C. 371 of, International Application No. PCT/US2013/028222, filed Feb. 28, 2013, which claimed priority to U.S. Provisional Application No. 61/606,148, filed Mar. 2, 2012, for all subject matter common to both applications. The disclosures of said applications are hereby incorporated by reference in their entirety.

FIELD OF THE INVENTION

The present invention relates to a computer implemented display suitable for presenting information to a user, and more particularly to a visual display having an arrangement of selectable indicators having various topical associations with information content in a manner that enables comparisons of information content being displayed, the position or arrangement of the indicators being based on a perspective, vantage point, or alternative, of the information content being compared.

BACKGROUND OF THE INVENTION

Over time, increasing amounts of information have been stored on computers. With so much information being stored, there have been numerous solutions for providing users with the ability to search through the information and locate desired portions of the information. The field of computer science has provided data structures and database technology. The Internet is searchable using numerous different search engines, including Google™, Yahoo®, and others. Furthermore, news companies, such as CNN, MSNBC, Fox News, et al., place vast amounts of news stories online, using different search engine technologies to enable users to find particular stories and content. Likewise, online shopping companies, such as Amazon.com offer consumers the ability to search and locate items for purchase using various search engine capabilities. Most websites operated by companies, organizations, entities, or even individuals, provide countless methods for searching and displaying information to users.

However, with all of the above mechanisms for managing information, the eventual display of that information has shortcomings in its ability to correlate and present the information in a logical way that illustrates topical associations between the information content in a manner enabling users to efficiently navigate through the resulting information, leveraging those associations. Further, the ability for users to compare information content from different sources is extremely difficult and cumbersome, requiring the user to conduct their own independent multiple searches to find related subject matter. The present invention addresses these shortcomings.

SUMMARY

There is a need for greater and more comparative access to information content. The present invention is directed toward solutions to address this and other needs, in addition to having other desirable characteristics that will be appreciated by one of skill in the art upon reading the present specification.

In accordance with one embodiment of the present invention, a computer implemented interactive comparative display of information includes a first plurality of subject indicators all associated with a first category of subject matter. The first plurality of subject indicators include a selected subject indicator representing a first subject falling within the first category of subject matter, and at least one selectable subject indicator representing at least a second subject falling within the first category of subject matter. The display further includes a first selectable result indicator representing information content that is topically associated with the first subject, and at least a second selectable result indicator representing information content that is different from the information content represented by the first selectable result indicator and is also topically associated with the first subject. The information content represented by the first selectable result indicator is comparable with the information content represented by the second selectable result indicator in such a way that results in formation of the comparative display of information.

In accordance with aspects of the present invention, the information content represented by the first selectable result indicator is comparable with the information content represented by the second selectable result indicator if the information content represented by the first selectable result indicator is of a same type of information content but from a different perspective from the information content represented by the second selectable result indicator. Optionally, the information content represented by the first selectable result indicator is comparable with the information content represented by the second selectable result indicator if the information content represented by the first selectable result indicator is of a same type of information content but from a different vantage point than the information content represented by the second selectable result indicator. Further optionally, the information content represented by the first selectable result indicator is comparable with the information content represented by the second selectable result indicator if the information content represented by the first selectable result indicator is of a same type of information content but is an alternative to the information content represented by the second selectable result indicator.

In accordance with aspects of the present invention, the display can further include more than two selectable result indicators each representing information content that is comparable with the information content of each of the other selectable result indicators. The information content represented by the first selectable result indicator can originate from a different source than the information content represented by the second selectable result indicator.

In accordance with aspects of the present invention, the information content represented by the first selectable result indicator can originate from a different source than the information content represented by the second selectable result indicator, and each source can be affiliated with a perspective of a range of perspectives sortable along a spectrum of a topical continuum for a topic. The information content represented by the first selectable result indicator can have an affiliated perspective falling within a predetermined first portion of the spectrum and is positioned in a first portion in the display, and the second selectable result indicator can have an affiliated perspective falling within a predetermined second non-overlapping portion of the spectrum and is positioned in a second non-overlapping portion in the display. The predetermined first portion of the spectrum can correspond to a first political party and the predetermined second non-overlapping portion of the spectrum corresponds to a second political party. The first and second selectable result indicators can be positioned in an order in the display, and the order can be the same as an order of affiliated perspectives of sources of the first and second selectable result indicators along the spectrum. There can be a plurality of selectable result indicators in addition to the first and second selectable result indicators, each representing information content, and those selectable result indicators having affiliated perspectives of the range of perspectives grouped together in a predetermined portion of the spectrum are displayed proximal each other in the display, while those selectable result indicators having affiliated perspectives of the range of perspectives not grouped together in a predetermined common portion of the spectrum are displayed distal each other. The proximal distances and the distal distances are relative to each other in such a way that proximal distances are smaller than distal distances.

In accordance with aspects of the present invention, there can be a plurality of selectable result indicators in addition to the first and second selectable result indicators, each representing information content, and the display can further include one or more user input tools for enabling users to submit input about one or more of the plurality of selectable result indicators.

In accordance with aspects of the present invention, there can be a plurality of selectable result indicators in addition to the first and second selectable result indicators, each representing information content, and the display can further include one or more user input tools for enabling users to submit input about one or more of the plurality of selectable result indicators, wherein a position of at least one of the plurality of selectable result indicators can be determined at least partially based on received user input. An affiliated perspective of the users can be based at least in part on one or more of a user profile, a user tag, and user metadata. The received user input can include one or more of user rankings, user ratings, user assigned weights, or user comments.

In accordance with aspects of the present invention, the display can further include one or more user input indicators each presenting input submitted by a user about a selectable result indicator of the first selectable result indicator and the at least a second selectable result indicator.

In accordance with aspects of the present invention, the display can further include a first user comment submitted by a first user about the first selectable result indicator, the first user being affiliated with a first perspective of a plurality of perspectives that lie in a predetermined portion of a spectrum also containing an affiliated perspective of the first selectable result indicator. The first user comment can have a position in the display that is determined at least partially based on user input associated with the first user comment, and any user input that is used to determine the position of the first user comment can include user input received from one or more users affiliated with a perspective of a range of perspectives lying within a predetermined portion of a spectrum.

In accordance with aspects of the present invention, a related category indicator can be displayed in conjunction with the selected subject indicator, the related category indicator representing a second plurality of subject indicators all associated with a second category of subject matter. The second plurality of subject indicators can include the selected subject indicator. The related category indicator can be selectable, and selection of the related category indicator can cause display of the second plurality of subject indicators. The related category indicator can be selectable, and selection of the related category indicator can cause the second plurality of subject indicators to replace the first plurality of subject indicators in the display.

In accordance with aspects of the present invention, the first plurality of subject indicators, the first selectable result indicator, and the related category indicator can all be presented in a single display.

In accordance with aspects of the present invention, the first plurality of subject indicators can include one or more of event indicators, travel information indicators, hotel information indicators, recipe indicators, food indicators, movie indicators, or sports indicators. The first selectable result indicator and the at least a second selectable result indicator can include a link pointing to a network location holding the corresponding content information. Each of the first plurality of subject indicators can be displayed as a graphically rotatably selectable dial. The information content of the first selectable result indicator and the information content of the at least a second selectable result indicator can be associated with tags.

In accordance with aspects of the present invention, the display can further include social media tools. The social media tools can include one or more of comments, ratings, rankings, likes, dislikes, chat, messaging, voting buttons, or polling buttons.

In accordance with aspects of the present invention, the first plurality of subject indicators, selected subject indicator, at least one selectable subject indicator, first selectable result indicator, and at least a second selectable result indicator can all be displayed simultaneously in the same display.

In accordance with aspects of the present invention, a payment module, or a transaction module can be provided. One or more prediction buttons can each be presented in conjunction with the first selectable result indicator, the at least a second selectable result indicator, or a combination thereof. The first plurality of subject indicators can be arranged in a string configuration. Selection of one of the at least one selectable subject indicator can cause the first and at least a second selectable result indicators to be replaced. The first and at least a second selectable result indicators can include one or more of a publication date and a source identifier.

In accordance with aspects of the present invention, a position of each of the first selectable result indicator representing information content and the at least a second selectable result indicator in the display relative to each other is based on an affiliated perspective of the information content.

In accordance with aspects of the present invention, a position of each of the first selectable result indicator representing information content and the at least a second selectable result indicator in the display relative to each other is based on an affiliated vantage point of the information content.

In accordance with aspects of the present invention, a position of each of the first selectable result indicator representing information content and the at least a second selectable result indicator in the display relative to each other is based on an affiliated alternative of the information content.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to an interactive comparative display of information (e.g., which can be implemented as a graphical user interface). The interactive comparative display provides tracks that are each associated with a specific category. Situated along a track is one or a plurality of subject indicators each representing subject matter that is topically or otherwise associated with the category of the track. When a user selects one of the subject indicators, a plurality of result indicators are presented in the interactive comparative display 10. Each result indicator represents resulting information content (e.g., which can be in video, audio, picture, textual, and other formats). The result indicators can include links embedded therein that, when clicked by a user, navigate the user's browser client to a URL or other network location hosting the requested resulting information content. Notably, users can be enabled to browse through a plurality of different tracks all including a different plurality of subject indicators but all sharing at least one subject indicator. In this manner, users are enabled to explore new tracks of information, e.g., on the basis of topical, or other, overlap between the categories of different tracks. In illustrative embodiments, some or all of the plurality of different subject indicators presented in conjunction with a particular subject indicator provide a different perspective, vantage point, or alternative on the subject matter represented by the selected subject indicator. Thus, the interactive comparative display can provide users with the ability to more easily compare and explore associations among categories. The interactive comparative display further can provide users with access to new comparisons and types of comparisons of the various perspectives, vantage points, and/or alternatives of different instances of resulting information content.

FIGS. 1 through 7, wherein like parts are designated by like reference numerals throughout, illustrate example embodiments of an interactive electronic display of information according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 1:
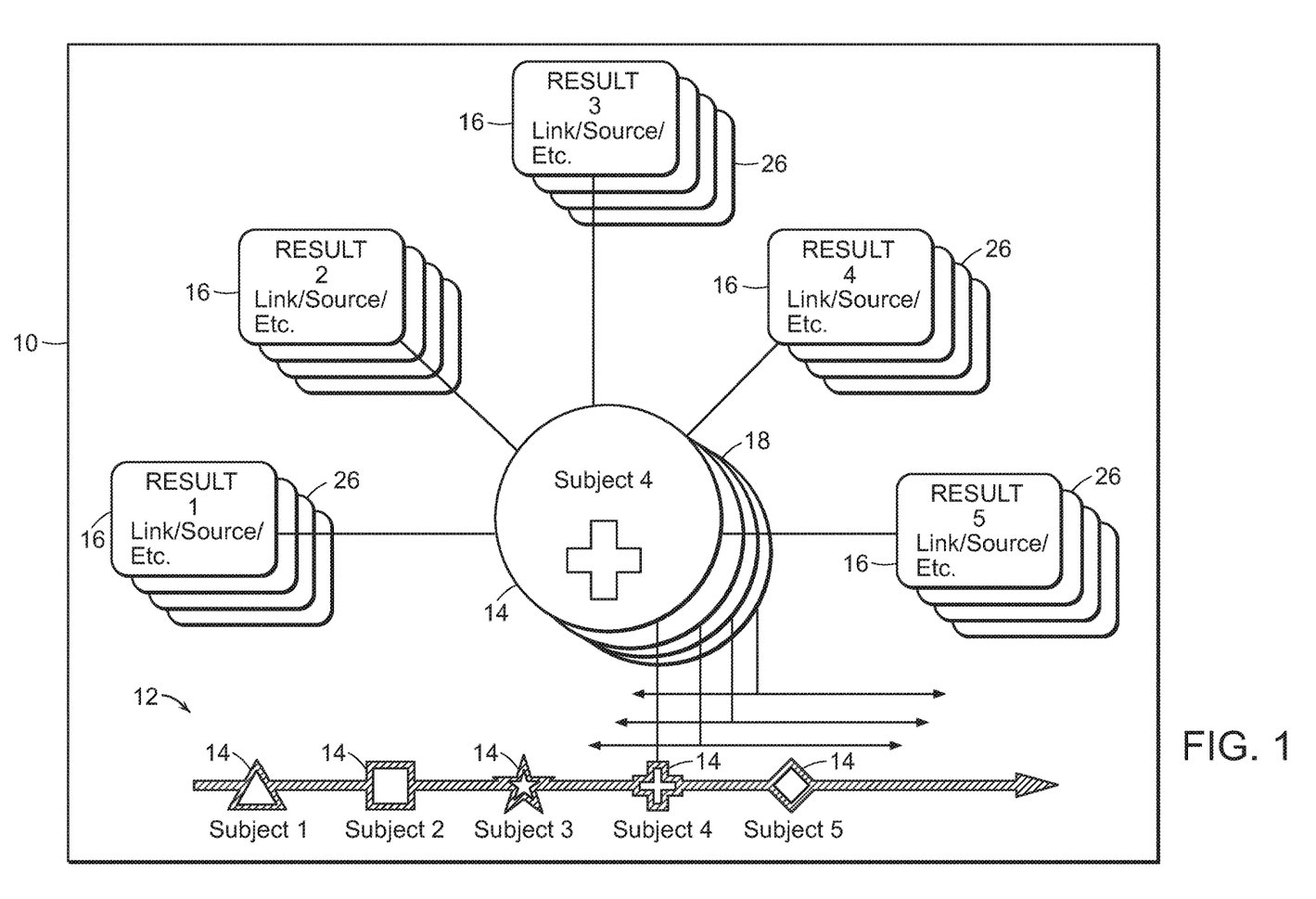
FIG. 1 is an example embodiment of an interactive comparative display, according to embodiments of the present invention.

FIG. 1 depicts an electronic interactive comparative display 10 of information according to an example embodiment of the present invention. The interactive comparative display 10 is generated by at least one processor (e.g., as a plurality of user interface elements, as would be appreciated by one of skill in the art) and presented on least one presentation component of a computing device, as will be described in greater detail herein. The interactive comparative display 10 includes one of a plurality of tracks 12, which in the example embodiment of FIG. 1 is depicted as a straight line. Each track 12 is associated with a specific category. The category of the track 12 can be any type of category, including, as non-limiting examples, a news category (e.g., "Iran"), a sports category (e.g., "New England Patriots Postseason 2012"), an editorial category (e.g., "Fashion Recap of the Oscars"), a category of items being reviewed (e.g., a category of movies, a category of books, a category of products, a category of foods, a category of recipes, etc.), a specific company (e.g., "Pfizer"), a category of travel, a category of science, a category of technology, a category of services, custom-defined categories by users or by third parties, or any other category. In short, the category is some definable collection of information. The category of each track 12 imposes a topical criterion upon information to be presented in conjunction with the track 12. Stated differently, each track 12 provides a mechanism for presenting information topically, or otherwise, associated with (e.g., within the topical bounds of, or somehow related to) the category of the track 12. Optionally, the track 12 can form or be associated with a scale or continuum (e.g., a numeric scale). For example, the track 12 can define a time scale, a monetary scale, a ranking scale, and any other ordered or comparative scale. In such embodiments, positions along the track 12 can delineate, e.g., specific times, specific prices, specific dollar amounts, specific ranks, etc.

Each track 12 can include one or more subject indicators 14. Each subject indicator 14 represents a particular subject matter that is topically, or otherwise, associated with (e.g., that falls within the topical bounds of, or is somehow related to) the category of the track 12. As non-limiting examples, the subject indicators 14 can include event indicators representing events (e.g., news events, sports events, historical events, future events, events as described by actions or desires, or events as defined by a particular reference point of information, or the like), flight indicators representing flights (e.g., flights corresponding to a defined interval of departure times, etc.), recipe indicators representing recipes (e.g., "grilled steak," "fish and chips," "roasted garlic hummus," etc.), movie indicators (e.g., "Little Mermaid," "Shrek," "Beauty and the Beast," "Snow White and the Seven Dwarves," etc.), a movie type indicator (e.g., "action," "drama," "comedy," "romantic film," etc.), and any other subject indicators 14 representing a subject. Optionally, in embodiments where the track 12 forms or is associated with a scale, each subject indicator 14 of the scalar track 12 can be associated with a value on the scale (an associated scalar value). For any such subject indicator 14, the associated scalar value can be used to determine the position of that subject indicator 14 on the scalar track 12. Stated differently, the display coordinates of a subject indicator 14 relative to the display coordinates of a scalar track 12 can be determined based on a scalar value associated with that subject indicator 14.

In some illustrative embodiments, all of the subject indicators 14 included in any single track 12 are of the same type. For example, in some embodiments, the interactive comparative display 10 is adapted to present news information (e.g., news articles) and all of the subject indicators 14 included in any such news track 12 specifically are event indicators, each of which represents a specific news event (e.g., "U.S. Invades Iraq," "Obama Elected President of the U.S.," "Nuclear Power Plant Melts Down in Japan," etc.). In some other embodiments adapted for presenting travel information, the track 12 can be a travel track that includes the following subject indicators 14: a flight indicator representing a grouping of potential flights (e.g., grouped based on departure time), a rental car indicator representing a grouping of potential rental car reservations (e.g., grouped based on pick-up time), and a hotel room indicator representing a grouping of potential hotel rooms (e.g., based on check-in time). It should be appreciated that the type of subject indicators 14 included in any single track 12 is in not limited to the example provided herein. Rather, the particular choice of subject indicators 14 can depend on the intended applications of the interactive comparative display 10. All alternative types and choices of subject indicators 14 are contemplated within the scope of the present invention.

The subject indicators 14 on each track 12 are selectable. When a subject indicator 14 is selected, a plurality of result indicators 16 that are topically, or otherwise, associated with the selected subject indicator 14 are presented within the interactive comparative display 10. In illustrative embodiments, the plurality of result indicators 16 are hidden from view unless the subject indicator 14 with which they are associated becomes selected, at which point the plurality of result indicators 16 become visible in the interactive comparative display 10. The result indicators 16 are presented in conjunction with the selected subject indicator 14 in such a way as to indicate association between the result indicators 16 and the selected subject indicator 14. Each result indicator 16 represents resulting information content that pertains to the subject represented by the selected subject indicator 14. More specifically, in illustrative embodiments, the result indicators 16 represent digital content narrating (e.g., in written textual form or any other form) information about the subject matter represented by the selected subject indicator 14. For example, in some illustrative embodiments adapted for presenting news information, the selected subject indicator 14 is a news event indicator representing a particular news event and each result indicator 16 associated with the selected news event indicator is an article indicator representing a published news article (e.g., accessible online) that describes the news event.

Each of the result indicators 16 can be selectable and can include a link pointing to a network location (e.g., a URL) hosting the particular resulting information content (e.g., the particular news article) being represented. Alternatively or additionally to including a link, the result indicators 16 can be selectable such that selection thereof causes the represented resulting information content to be presented in an information content pane within the interactive comparative display 10. It should be appreciated that these examples for presenting or causing information content to be presented are provided for purposes of illustration and do not limit embodiments of the present invention. One of skill in the art will appreciate a variety of other ways to present associated information content (e.g.., in digital format) in response to selection of a result indicator 16 upon reading the present specification. All such modifications, alternatives, and additions are contemplated within the scope of the present invention.

Furthermore, it is contemplated that in many instances, each subject indicator 14 (or just some of the subject indicators 14) will be included in numerous different tracks 12 due to that subject indicator 14 representing a particular subject matter that happens to be associated with more than one category of tracks 12. In fact, in some implementations, the categories of tracks 12 can be constructed and defined in such a way as to promote overlap in the various subjects associated therewith. For embodiments implemented to present news information, a few non-limiting examples of such categories with overlapping associated subject matter can include: "Barak Obama," "2008 U.S. Presidential Race," and "Democratic Party." Each such category can serve as the category of a news track 12. In such implementations where there is overlap between subject matter (e.g., news events) associated with the various categories of the tracks 12 (e.g., news tracks 12), it is likely that each subject indicator 14 will be included in more than one track 12. For example, the news event "Obama wins the 2008 U.S. presidential election" can be included in a "Barak Obama" news track 12, in a "2008 U.S. Presidential Race" news track 12, and in a "Democratic Party" news track 12. One of skill in the art will appreciate that the particular categories selected for the tracks 12 will vary depending on the intended application and the type of information content being presented. The present invention is not limited to any specific example provided herein. Rather, all modifications, alternatives, and additions are contemplated within the scope of the present invention.

Accordingly, the interactive comparative display 10 can be configured to enable users to browse through multiple tracks 12 that share particular subject matter (as represented by a common subject indicator 14). More specifically, illustrative embodiments of the present invention provide that the interactive comparative display 10 includes one or more display features that allow users to browse through all tracks 12 that include the selected subject indicator 14. In some such illustrative embodiments that enable browsing between related tracks 12, only one track 12 is presented in the interactive comparative display 10 in view mode at any given time. As utilized herein, "view mode" generally refers to a mode of operation in which a track 12 is activated for interactive viewing in the manner described herein (e.g., in a manner enabling the presentation of result indicators 16 based on user selection of a subject indicator 14, etc.). In yet other embodiments of the present invention, however, it may be possible for the interactive comparative display 10 to provide multiple tracks 12 simultaneously in view mode. One of skill in the art will appreciate a variety of ways to implement interactive viewing of the tracks 12 upon reading the present specification. All such modifications, alternatives, and additions are contemplated within the scope of the present invention.

One example embodiment will now be described that provides users with browsing capability between related tracks 12 all sharing common subject matter (as represented in the interactive comparative display 10 by a common subject indicator 14). In the example embodiment, only one track 12 is in view mode at any given time. The browsing capability is enabled by one or a plurality of related track indicators 18. Each related track indicator 18 represents a different track 12 (different from the track 12 currently in view mode) that includes a different plurality of subject indicators 14 (different from the subject indicators 14 of the track 12 currently in view mode). The different plurality of subject indicators 14 includes the selected subject indicator 14 of the track 12 currently in view mode. The related track indicators 18 are presented in the interactive comparative display 10 in conjunction with the selected subject indicator 14, e.g., such that the related track indicators 18 remain hidden until the associated subject indicator 14 becomes selected, at which point the related track indicators 18 become visible in the interactive comparative display 10 along with the selected subject indicator 14. For example, the related track indicators 18 can form a cascade behind the selected subject indicator 14, as depicted in FIG. 1. The related track indicators 18 are selectable, such that selection of any one of the related track indicators 18 activates view mode for the related track 12 represented by that related track indicator 18. Activation of view mode for the related track 12 represented by a related track indicator 18 can be implemented in any number of ways, including, for example, visual replacement of the track 12 previously in view mode with the related 12 represented by the selected related track indicator 18. One of skill in the art will appreciate yet other ways to implement activation and deactivation of view modes for various tracks 12 upon reading the present specification. All such alternatives, modifications, and additions are contemplated within the scope of the present invention.

Accordingly, in this manner as described above, the interactive comparative display 10 can provide a convenient user interface for user exploration of various tracks 12 on the basis of subject matter overlap in the categories of those tracks 12, as defined to be linked by a common/shared subject matter in those tracks 12. Selected subject indicators effectively serve as a portal for enabling users to explore and activate different tracks 12 having overlapping subject matter.

In illustrative embodiments, as a user browses through the related tracks 12, the subject matter being represented by the currently selected subject indicator 14 does not change. Nonetheless, it should be appreciated that the visual presentation of the currently selected subject indicator 14 can change as a user browses through the related tracks 12 (e.g., so long as the changes in the visual presentation of the currently selected subject indicator 14 do not change the subject matter that is being represented thereby). For example, in some embodiments, each related track indicator 18 possesses a different color, such that each color effectively represents a different related track 12.

Figure 2:
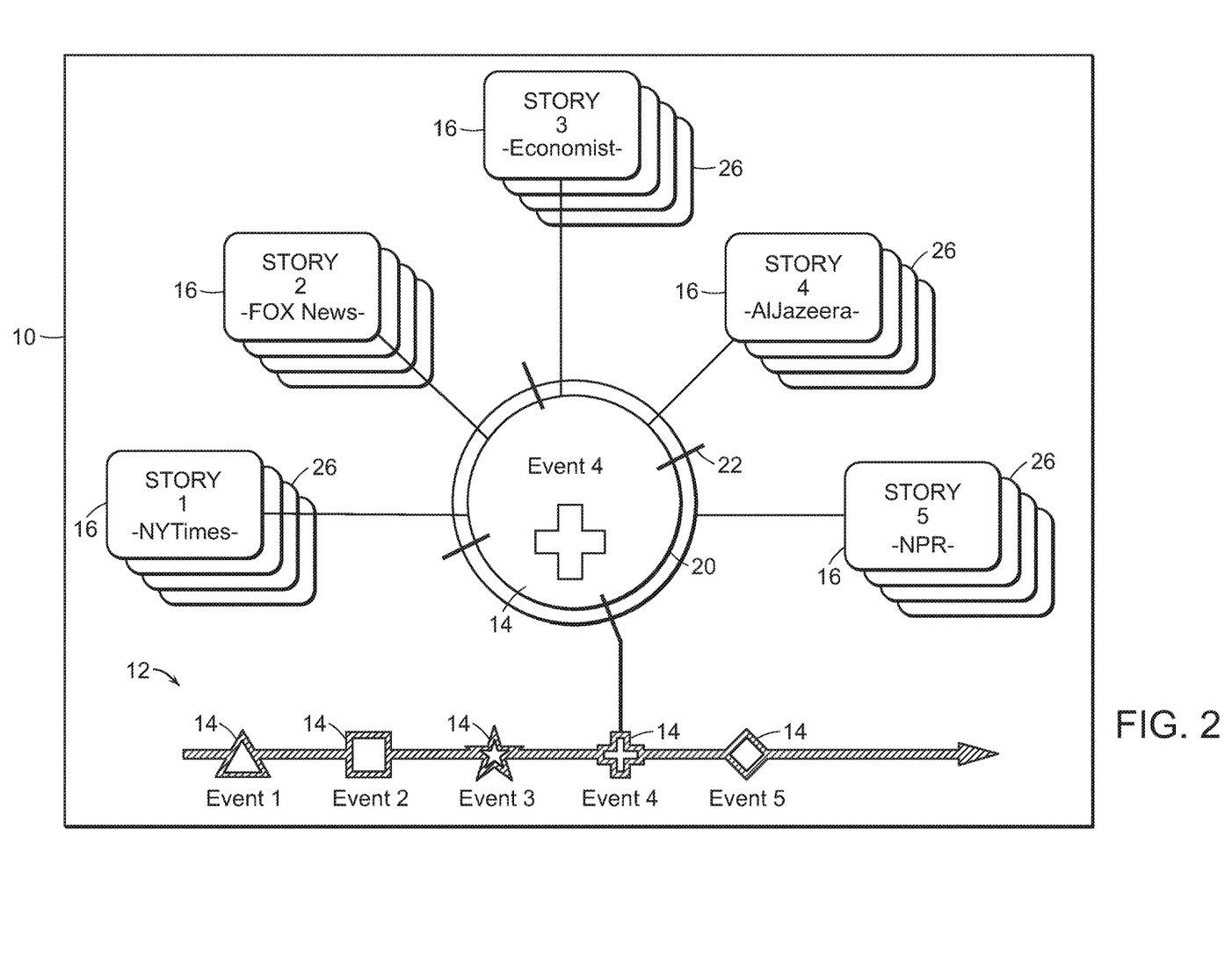
FIG. 2 is an example embodiment of an interactive comparative display including a dial tool, according to further embodiments of the present invention.

Alternatively or additionally to the related track indicators 18, each subject indicator 14 can form a graphical dial 20 once the subject indicator 14 is selected by a user, as depicted in FIG. 2. The dial 20 can be rotatable by the user within the interactive comparative display 10 and optionally can include markers 22 (e.g., ticks) situated around its perimeter. Similar to the related track indicators 18, each marker 22 likewise can represent a different track 12 (different from the track 12 currently in view mode) that includes, among its different plurality of subject indicators 14, the selected subject indicator 14 from the track 12 currently in view mode. Accordingly, in such embodiments, the track 12 that is presented in view mode in the interactive comparative display 10 changes as a user turns the dial 20 to select different markers 22. In such example embodiments, the interactive comparative display 10 can be adapted to always present in view mode the track 12 associated with the selected marker 22 on the dial 20.

It should be appreciated that the interactive comparative display 10 can be configured to accept and respond to different types of user input, e.g., depending on the particular user device on which the interactive comparative display 10 is presented. For example, if the user device is a traditional personal computer (PC) or laptop computer, the user input can include mouse movements, mouse clicks, etc. The dial 20 thus can be turned, e.g., by manipulating a mouse to move a cursor over the dial 20, clicking the mouse to engage the cursor with the dial 20, moving the mouse in a rotational fashion to turn the dial 20. Such an interaction with the interactive comparative display 10 can likewise be implemented by different user input on a different type of user device. For example, if the user device is a tablet computer having a multi-touch screen configured to receive a variety of different gestures, then the dial 20 can be turned by the user touching the multi-touch screen with his/her a finger at a position where the dial 20 is located and moving his/her finger in an arc to turn the dial 20. As yet another example, if the user device is a smart phone device with an accelerometer or other suitable motion detection mechanism included therein, then the dial 20 can be turned by abruptly or sharply pivoting the smart phone device. One of skill in the art will appreciate that these examples of user input for providing interactive capability with the interactive comparative display 10 are illustrative and in no way limiting. Rather, all suitable alternative forms of user input are contemplated within the scope of the present invention.

Figure 3:
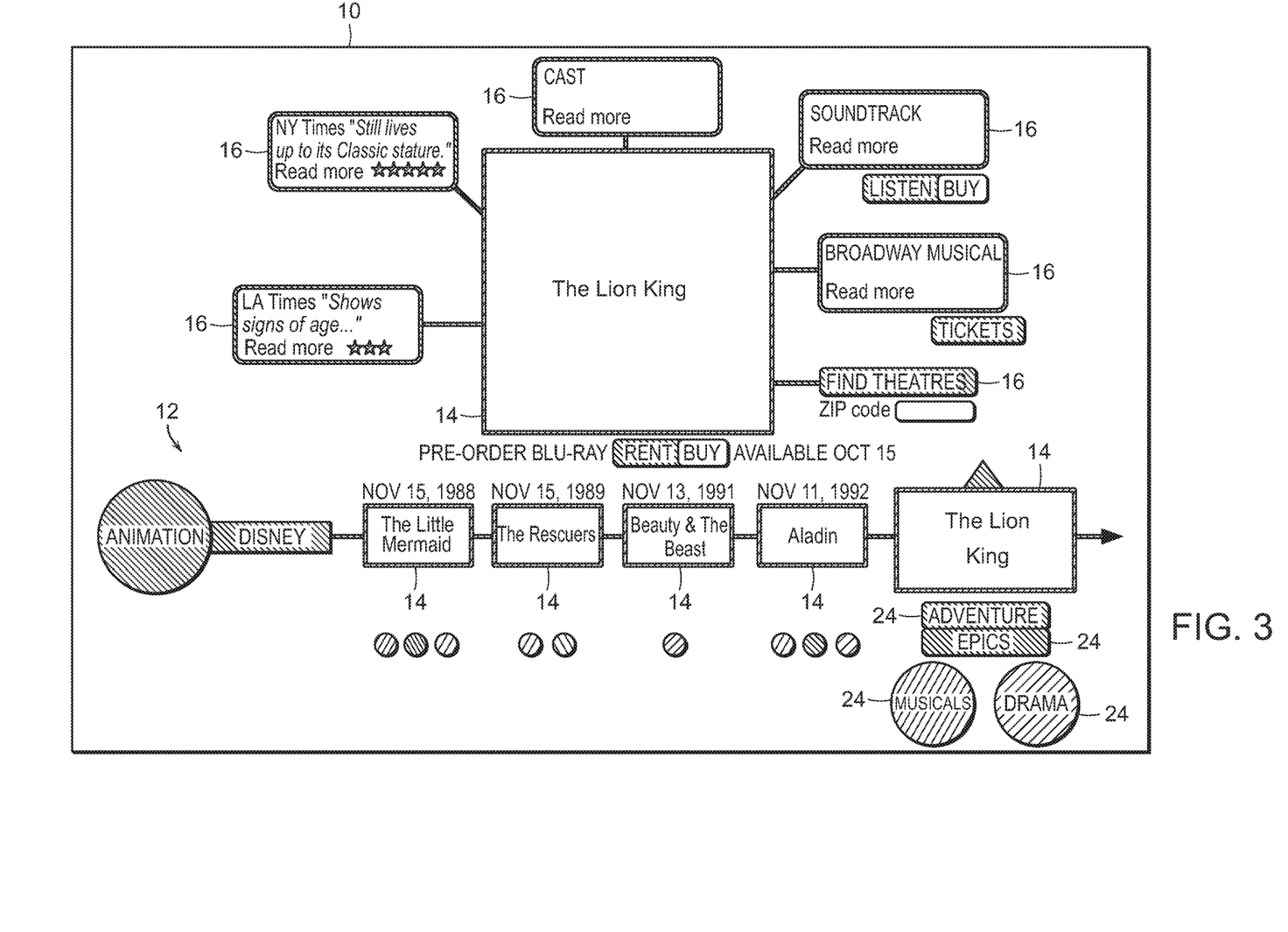
FIG. 3 is an example embodiment of an interactive comparative display including one or more related tracks buttons, according to embodiments of the present invention.

In yet other embodiments (additionally or alternatively to utilizing the related track indicators 18 or the dials 20), users are enabled to navigate through tracks 12 linked by a shared subject matter by selecting related track buttons. For example, FIG. 3 depicts an example embodiment of the interactive comparative display 10 including and presenting such related track buttons 24. For example, each related track button 24 can present a category associated with a different track 12 (different from the track currently in view mode) that includes, among its different plurality of subject indicators 14, the selected subject indicator 14 of the track 12 currently in view mode. One of skill in the art will appreciate yet other ways to implement browsing between related tracks 12 that are linked by a shared subject matter. All such alternatives, modifications, and additions are contemplated within the scope of the present invention.

In illustrative embodiments of the present invention, the result indicators 16 that are presented in conjunction with the selected subject indicator 14 depend not only on the subject indicator 14, but also on the particular category of the track 12 that includes the selected subject indicator 14. Accordingly, in such illustrative embodiments, as users browse through related tracks 12 linked by a shared subject matter (e.g., the subject matter represented by the selected subject indicator 14), the result indicators 16 will all change since such browsing action will also change the category that is associated with the track 12 currently in view mode. As such, the interactive comparative display 10 optionally can include a plurality of inactive result indicators 26 associated with each of the result indicators 16. For each result indicator 16, each associated inactive result indicator 26 corresponds to one of the related track indicators 18 and/or one of the markers 22 and/or one of the related track buttons 24. Accordingly, the inactive result indicators 26 become active (e.g., selectable to follow an embedded link) during browsing as a user activates the corresponding related tracks 12. Each plurality of inactive result indicators 26 can be presented in conjunction with its associated result indicator 16. For example, as depicted in FIG. 1, each plurality of inactive result indicators 26 can form a cascade behind its associated result indicator 16.

Optionally, in accordance with aspects of the present invention, the interactive comparative displays 10 are implemented in part using tags (e.g., metadata, meta elements, meta tags, labels, sub-tags, and any other form or type of tag). For example, the interactive comparative displays 10 can be implemented by database(s) including: (a) a plurality of entries each representing some resulting information content (each of which represents, e.g., a news article presented on a news track 12 by a news indicator 14); (b) one or a plurality of tags associated with each resulting information content entry in the database(s); (c) a plurality of entries each representing a subject; and (d) one or a plurality of tags associated with each subject entry in the database(s). The tags on the resulting information content entries in the database(s) can provide characterizations about the resulting information content. Furthermore, the tags on the resulting information content entries can be used to determine the graphical and UI associations between result indicators 16 and subject indicators 14 in the interactive comparative display 10. In general, the tags on the resulting information content can include conventional tags, as would be appreciated by those of skill in the art, or can include new types and categories of tags designed specifically for the purpose of facilitating use with the interactive comparative display 10. Similarly, the tags on the subject matter entries in the database(s) can include conventional and/or novel types and categories of tags and can provide characterizations of the subject matter entries in the database(s) useful in facilitating operation of the interactive comparative display 10. Tags on the subject matter entries thus can indicate one or more categories with which the subject matter entries are topically, or otherwise, associated. The categories indicated in such tags can be used to build tracks 12 in the interactive comparative display 10 (e.g., in response to a user query that contains one or more of the categories).

A few non-limiting examples of tags associated with the narrative content entries in the database(s) will now be described. In some embodiments adapted for presenting news information, the subject indicators 14 are news event indicators each representing a news event, and the result indicators 16 are article indicators each representing a news article reporting on or otherwise covering one or more of the news events. In such embodiments, the resulting information content entries in the database (e.g., the article entries) can be associated with tags indicating an author or news source that published the article, tags indicating political bias (e.g., of the author or the news source that published the article), tags indicating whether the articles are "for" or "against" the subject/general proposition discussed by the author therein, tags indicating a date of publication, and tags indicating one or more news events that the article reports on (e.g., discusses, reports on, raises, reviews, criticizes, etc.), tags indicating a date of publication, tags indicating values lying on a scale of the track 12, etc. These examples of tags are illustrative and do not limit embodiments of the present invention. Rather, one of skill in the art will appreciate a variety of other tags that may be used upon reading the present specification. All such alternatives, modifications, and additions are contemplated within the scope of the present invention.

Tags associated with the resulting information content entries and/or the subject matter entries generally can be generated in any one or more of the following ways, as will be appreciated by one of skill in the art upon reading the present specification: automatically (e.g., all news articles originating from a particular author or news source are automatically tagged as having a particular specific political bias), via crowdsourcing (e.g., among users interacting with the interactive comparative display 10), and/or by system administrators (e.g., by original publishers of the resulting information content).

Optionally, the tags can be used to enable a variety of additional features, according to further aspects of the present invention. For example, the tags can be used to enable users to query the database(s) (e.g., using a search bar that can be included in the interactive comparative display 10, etc.) and thereby cause the interactive comparative display 10 to generate tracks 12 based on user-submitted queries (and optionally user-defined queries). Furthermore, some tags (e.g., indicating subject matter association with a particular category, subject, etc.) can be weighted to indicate the relevance of the tagged entry relative to the particular category, event, etc. in the tag. Such relevance weightings of the category tags on subject matter entries, subject tags on resulting information content entries, etc. can be useful in determining which subject matter entries, resulting information content entries, etc. to present in the interactive comparative display 10. For example, in some instances, the category of a track 12 may be associated with more subjects than can visually fit on the track 12 in the interactive comparative display 10. In such instances, the relevance weightings of the category tags on subject matter entries in the database(s) can be used to determine which subject matter entries associated with the category of the track 12 will be represented in the interactive comparative display 10. As one non-limiting example, the interactive comparative display 10 (and the computing system implementing the interactive comparative display 10) can be configured to present a subject indicator 14 in the interactive comparative display 10 only for each of the N subject matter entries with the highest weighted associated category tags, where N is some positive integer number. In some embodiments, the interactive comparative display 10 includes one or more zooming tools (not shown) enabling users to adjust the number of subject indicators 14 being presented (and thus visible) in the interactive comparative display 10 (e.g., thereby enabling users to adjust the value of N). As will be readily appreciated by one of skill in the art, the size of the subject indicators 14 can be variable and can depend on the number of subject indicators 14 currently being presented in the interactive comparative display 10.

In a similar manner, subject tags on resulting information content entries in the database(s) can be used, e.g., to select which of a plurality of appropriately tagged resulting information content entries which should be presented in the interactive comparative display 10. Furthermore, the interactive comparative display 10 can include one or more presentation modifier tools enabling users to adjust the number of result indicators 16 presented in the interactive comparative display 10.

In some illustrative embodiments, the interactive comparative display 10 includes one or more filter tools (not shown) for enabling users to filter the result indicators 16 being displayed. For example, the filter tools can enable filtering of the result indicators 16 based on media format (e.g., video, sound, image, text, etc.), narrative type (e.g., editorial, reporting, satire, etc.), and any other suitable filter. The filter options can be based on characterizations by the tags. For example, in some embodiments adapted for presenting news information, users can be enabled to filter the result indicators 16 such that the interactive comparative display 10 only presents, in a particular track 12, result indicators 16 (e.g., article indicators) published by a particular selected news source (e.g., CNN, FOX, NYTimes, etc.). It should be appreciated that embodiments of the present invention are not limited to the specific examples of filters provided herein. Rather, one of skill in the art will appreciate a variety of alternative and/or additional types of filters that can be implemented using the filter tools. All such alternatives, modifications, and additions are contemplated within the scope of the present invention.

Furthermore, in some embodiments, the tags are used to position the result indicators 16. For example, in embodiments adapted for presenting news information, the result indicators 16 can be article indicators that are positioned based on the political bias (e.g., political persuasion, political leaning, etc.) of the author or publisher of the article. The narrative content information entries in the database(s) can be implemented, e.g., as article entries each representing an article about one or more news events. Article entries that are tagged as being published by politically left-leaning (liberal) news sources can be presented in the interactive comparative display 10 visually to the left of the selected subject indicator 14. Article entries in the database(s) tagged as being published by politically right-leaning (conservative) news sources can be presented in the interactive comparative display 10 visually to the right of the selected subject indicator 14. One of skill in the art will appreciate a variety of other ways to present the result indicators 16 in the interactive comparative display 10 (color, size, etc.), e.g., on the basis of the same of other characterizations indicated by the tags. The present invention is not limited to the specific examples provided herein. Rather, all suitable alternatives, modifications, and additions are contemplated within the scope of the present invention.

In other embodiments, instead or in addition to utilizing tags, the interactive comparative display 10 can be implemented, e.g., by pulling specific information from predefined fields in one or more web pages. For example, in some embodiments adapted for presenting travel information, flight information (e.g., departure/arrival times, flight numbers, costs, remaining seats available, etc.) from web page(s) hosted by one or more third-party web servers can be extracted and presented by the result indicators 16 (e.g., flight indicators, in this case). In such embodiments utilizing and presenting information from predefined fields, use of additional structure (e.g., in the form of tags) or additional categorization may not be necessary to provide user searching capability whereby tracks 12 are generated based on user-submitted (and optionally user-defined) queries.

In some embodiments, the interactive comparative display 10 includes social media tools enabling users to contribute and share certain interactions (e.g., comments, ratings, rankings, "likes," "dislikes," etc.) with the interactive comparative display 10. For example, the interactive comparative display 10 can include voting or polling buttons enabling users to vote or be polled on their personal preferences and opinions toward particular tracks 12, particular subject indicators 14, particular result indicators 16, and/or the like. The voting or polling information can be shared with other users via additional presentation features (not shown) in the interactive comparative display 10. Furthermore, users can be enabled to comment, "like," and/or "dislike" particular tracks 12, particular subject indicators 14, particular result indicators 16, and/or the like. In some embodiments, feedback from users received via the social media tools and/or other polling/voting/ranking tools can be utilized by the computing system implementing the interactive comparative display 10 to determine or adjust the weights, tags, etc. associated with the in the database(s). For example, the interactive comparative display 10 can present tools enabling users to submit to the computing system subject matter links between (a) categories of tracks 12 and subject matter of subject indicators 14, (b) subject matter of subject indicators 14 and resulting information content of result indicators 16, categories of tracks 12 and resulting information content of result indicators 16, and the like. In this manner, the generation/refinement of weights, tags, etc. in the database(s) can be crowdsourced to users viewing and interacting with the interactive comparative display 10.

Figure 4:
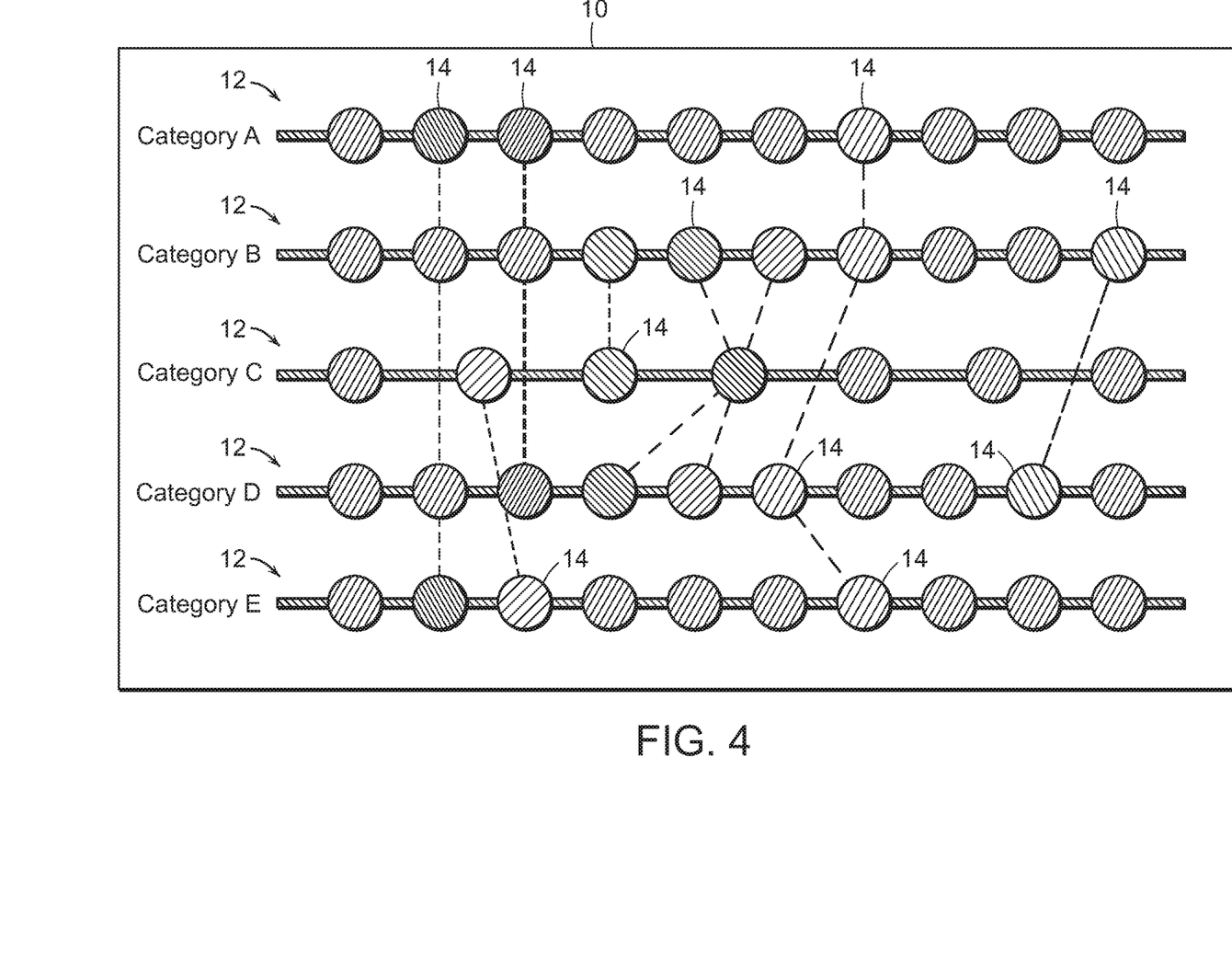
FIG. 4 is an example embodiment of an interactive comparative display providing one or more comparative analysis tools, according to embodiments of the present invention.

In some embodiments, the interactive comparative display 10 includes tools (not shown) enabling users to perform comparative analysis on different tracks 12. FIG. 4 depicts a screen shot showing such a comparative analysis. Subject indicators 14 on different tracks 12 are indicated in the interactive comparative display 10 as identical by a common color. For example, users can be enabled to select two or more tracks 12 for comparison and submit the selection to the computer system implementing the interactive comparative display 10; as a result of such a submission, the interactive comparative display 10 can present to the user a comparison depicting one or more of: overlap in subjects between the two or more selected tracks 12, overlap in resulting information content between the two or more tracks 12, overlap in particular tags between the two or more tracks 12, etc. Furthermore, users can be enabled to perform such comparative analyses by alternatively or additionally selecting one or more subject indicators 14 and/or one or more result indicators 16 for comparison. In such embodiments, based on such a selection and submission of subject indicators 14 and/or result indicators 16, the interactive comparative display 10 can present to the user tracks 12 sharing the subject matter represented by the selected subject indicators 14 and/or the resulting information content represented by the selected result indicators 16. As yet further potential comparative analysis tools enabled by the interactive comparative display 10, users can be provided with an ability to determine associations between different subjects. The associations can be presented to users as a chain of related tracks 12, where subsequent tracks 12 in the chain are linked by at least one common/shared subject. One of skill in the art will appreciate yet other types of comparative analysis tools that can be enabled and presented to users in the interactive comparative display 10 upon reading the present specification. All such alternatives are contemplated within the scope of the present invention.

EXAMPLE 1

Figure 5:
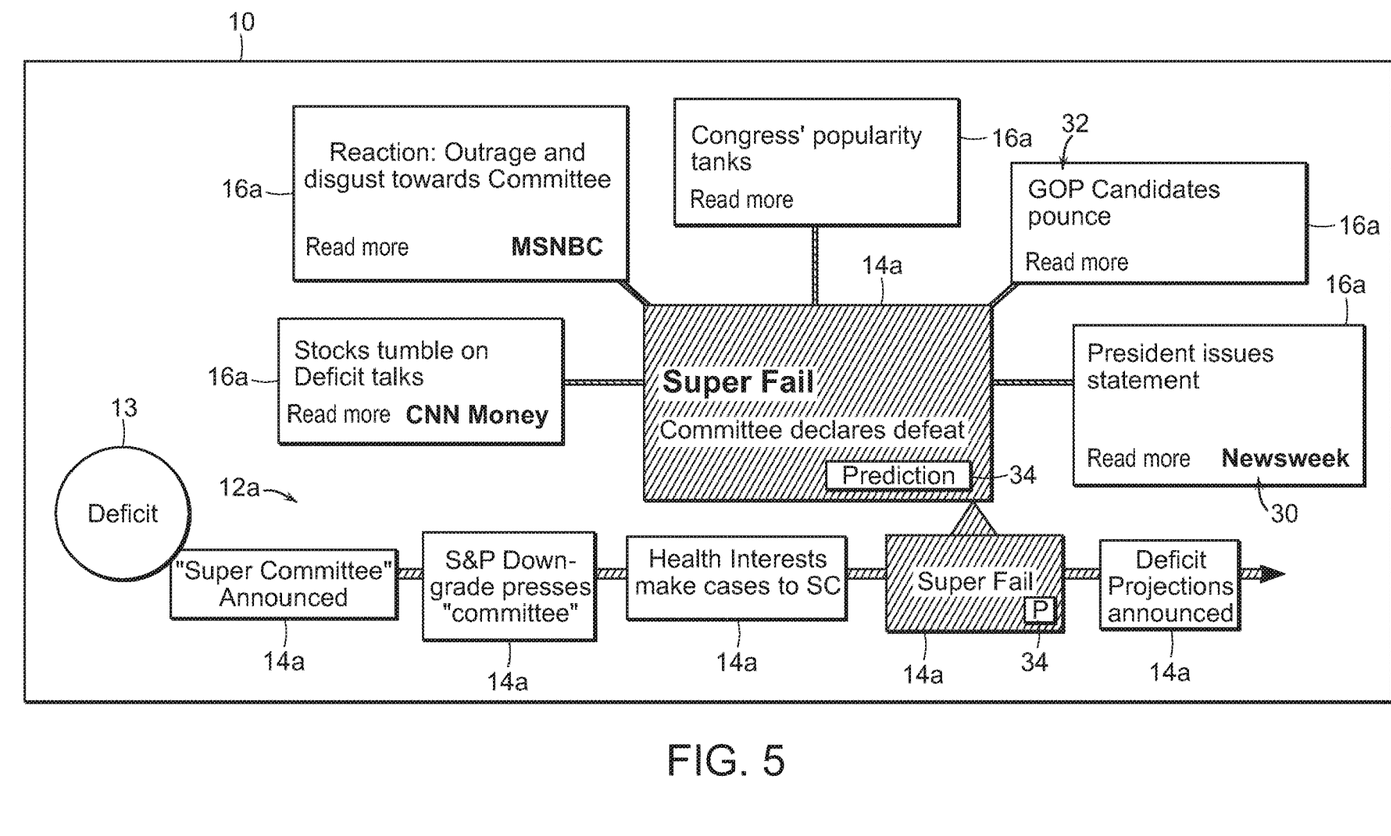
FIG. 5 is an example embodiment of an interactive comparative display adapted for presenting news information, according to embodiments of the present invention.

FIG. 5 depicts a screen shot of an example embodiment of the interactive comparative display 10 according to the present invention adapted for presenting news information. As depicted in FIG. 5, the interactive comparative display 10 includes a news track 12a in view mode. The subject indicators 14 can include, e.g., a plurality of event indicators 14a each representing a particular news event that occurred. The result indicators 16 can include, e.g., a plurality of article indicators 16a. As shown, one of the event indicators 14a is selected. Thus, the interactive comparative display 10 additionally is presenting a plurality of article indicators 16a each representing an article reporting on or otherwise covering the news event represented by the selected event indicator 14a. In the example embodiment of FIG. 5, the interactive comparative display 10 is included in a web page presented to users through their browser clients (e.g., web browsers). In such embodiments, by clicking on the article indicators 16a, users are enabled to follow links embedded in the article indicators 16a and thereby navigate their browser clients (e.g., web browsers) to URLs in the embedded links whereat web pages hosting the online published articles are located.

As depicted in FIG. 5, the category associated with the news track 12a is "U.S. Deficit," as presented by a category indicator 13. The event indicators 14a thus represent news events pertaining to the U.S. deficit, including "'Super Committee' Announcement," "S&P Down-grade presses 'committee,'" "Health Interests make cases to SC," Super Fail," and "Deficit Projections announced." Each of the event indicators 14a of FIG. 5 represents a different event pertaining to the U.S. deficit. In the screen shot presented in FIG. 5, the plurality of article indicators 16a represent articles about the event indicator 14a representing the event "Super Fail," which is selected. In illustrative embodiments of the present invention, each article indicator 16a presented in the interactive comparative display 10 for a given event indicator 14a is published by a different news sources. Stated differently, in illustrative embodiments of the interactive comparative display 10, there is not overlap between associated news sources among the presented article indicators 16a for a given event indicator 14a. In this manner, the article indicators 16a can present a plurality of different vantage points of various news sources on individual events. This can provide users of the interactive comparative display 10 with a unique browsing experience enabling them to compare and more easily identify editorial, political, and other bias between different news sources. Furthermore, this enables users to more quickly and readily access multiple vantage points and different points of view on a single news event, thereby allowing users to become more informed and enlightened consumers of news.

Optionally, an editorial descriptor 28 (e.g., "Committee declares defeat" for the selected event indicator 16a "Super Fail" of FIG. 5) can be presented in the interactive comparative display 10 in conjunction with (e.g., situated atop of, as depicted in FIG. 5) the selected event indicator 14a. Furthermore, the article indicators 16a can include news source identifiers 30 indicating the news sources that published the articles and title identifiers 32 indicating the title of the articles. In illustrative embodiments, the news track 12a forms a time scale (e.g., a timeline), and the event indicators 14a are placed at positions along the news track 12a indicating a particular time (e.g., date) or a chronological order of events represented thereby. Optionally, each event indicator 14a can include a time (e.g., date, month, etc.) indicator (not shown) presenting a particular date associated with that event indicator 14a.

In some embodiments, the interactive comparative display 10 additionally includes and presents a prediction tool enabling users to track predictions that were made and subsequently verified or disproved. For example, as depicted in FIG. 5, the interactive comparative display can include one or more prediction buttons 34 each presented in conjunction with a particular event indicator 14a. Each prediction button 34 indicates that the particular news event represented by the associated event indicator 14a was a part of a prediction, either as the conclusion (e.g., realization or disproof) of the prediction or the initial proposal/making of the prediction. By clicking the prediction button 34, the interactive comparative display 10 is caused to the "other end" of the prediction. For example, when the prediction button 34 is situated on a event indicator 14a to represent that the event indicator 14a (e.g., event indicator) is the conclusion of a prediction that was made, clicking the prediction button 34 can cause the interactive comparative display 10 to present (e.g., in a pop-up window) one or more earlier event indicators 14a and/or one or more earlier article indicators 16a representing the initial proposal/making of the prediction.

EXAMPLE 2

Another example embodiment of the interactive comparative display 10 according to the present invention will now be described with reference to FIG. 6. In this second example, the interactive comparative display 10 is adapted to present users with travel information. The subject indicators 14 include, e.g., a flight grouping indicator 14b, a rental car grouping indicator 14c, and a hotel room grouping indicator 14d. In the example embodiment of FIG. 6, the grouping indicators 14b, 14c, 14d each is visually presented in the interactive comparative display 10 as a highlighted portion of the scale formed by the travel track 12b. In the example embodiment of FIG. 6, the travel track 16b forms a time scale presenting times by the hour. The grouping indicators 14b, 14c, and 14d can be added and removed manually by users, e.g., by clicking corresponding add/remove buttons (e.g., "Add flight" button, "Remove flight" button, etc.). Furthermore, the grouping indicators 14b, 14c, 14d can be moved manually by users to different positions along the travel track 12b. In this manner, users can browse a plurality of different groupings of available flights (e.g., grouped/arranged by departure time, arrival time, etc.), groupings of available rental cars (e.g., by start time of reservation), and/or groupings of available hotel rooms (e.g., by check-in time).

Figure 6:
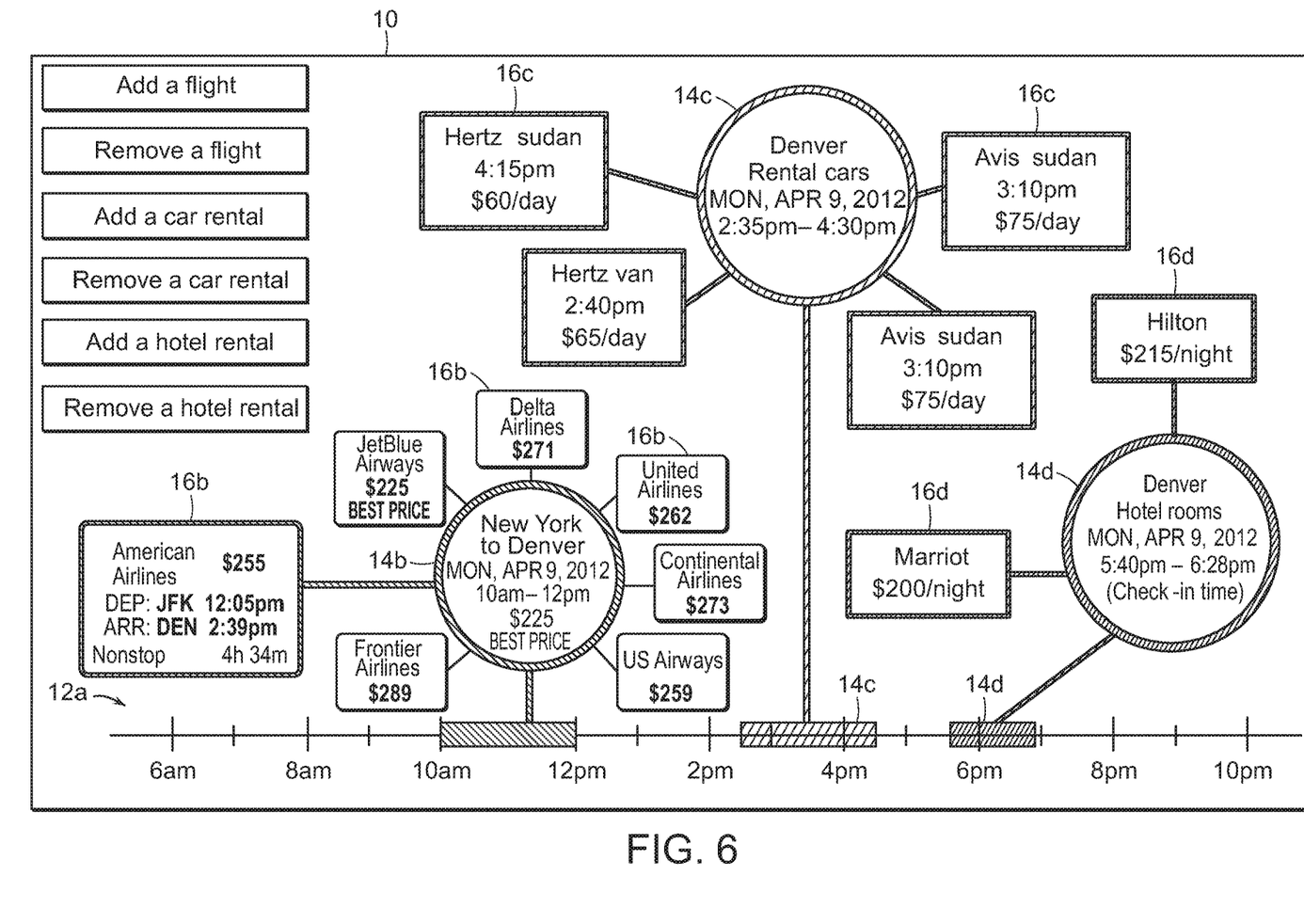
FIG. 6 is an example embodiment of an interactive comparative display adapted for presenting travel information, according to embodiments of the present invention.

In the example embodiment of FIG. 6, the result indicators 16 presented in the interactive comparative display 10 can include specific flight listings in the travel track 16b, specific rental car and/or agency listings 16c, and specific hotel and/or room listings 16d. The interactive comparative display 10 can be configured to present as the listings 16b, 16c, 16d only those that fall within the specific time interval on the time scale at which the grouping indicator 14b, 14c, 14d is positioned. In illustrative embodiments, the interactive comparative display 10 (and the computing system implementing the interactive comparative display 10) is configured to avoid presenting scheduling contradictions or conflicts between the different reservations being made (e.g., flight, rental car, hotel, etc.). For example, when a user moves one of the three grouping indicators 14b, 14c, 14d, the interactive comparative display 10 can automatically adjust the position of the some or all of the other grouping indicators 14b, 14c, 14d on the travel track 12b to avoid, e.g., presenting rental car and/or agency listings 16c that begin prior to the arrival of the flight listings 16b currently being presented.

Notably, the example embodiments of the present invention described herein can enable numerous benefits and advantages. For example, the interactive comparative display 10 can present a wide range of types of information content in an easily accessible, well-organized fashion that allows users to access and comprehend comparisons of information. Furthermore, the interactive comparative display 10 can allow users to become more informed and knowledge consumers of information by presenting comparisons of such information that have not been previously accessible. As just illustrative example, in some embodiments adapted for presentation of news information, users can be enabled to more clearly identify and thus recognize the presence of editorial, political, etc. bias in news sources. Furthermore, by providing users with the interactive comparative display 10, users are enabled to engage in more types of exploration and browsing of information content than is presently possible. Enhancing the ways that users browse can allow more granulated/specific tracking of users browsing habits and tendencies. Accordingly, one or more tools can be provided that enable more effective targeted advertising, or the like.

As yet further potential benefits, the interactive comparative display 10 can include a transaction or payment module 36 (see FIG. 1) that appears in conjunction with the result indicators 16 and/or the subject indicators 14. For example, the transaction or payment module 36 can be visually situated in the interactive comparative display 10 within the circular arrangement of result indicators 16, with a clickable icon or other graphical element as would be readily appreciated by those of skill in the art. The transaction or payment module 36 can allow users to "take action," e.g., in the form of monetary action like donating, paying for particular services being offered relating to a particular result indicator 16 and/or subject indicator 14, signing up for a news subscription, paying for a travel expense (e.g., flight, rental car, hotel room, etc.), linking to website that is organized to address a particular issue related to the content information of the result indicator 16, linking to a shopping website or retailer to enable the user to purchase a item, and the like. All of the "take action" links can be topically related to the information content of the particular result indicator 16 in which the transaction or payment module 36 appears. This can enable the interactive comparative display 10 to serve as a platform for enabling, e.g., third-party transactions/payments, actions, and the like. The benefits of such transaction/payment hosts are well understood in the art. One of skill in the art will appreciate yet other benefits not specifically described herein upon reading the present specification.

It should be appreciated that the type or format of information content being represented by the result indicators 16 is not limited. The interactive comparative display 10 according to the present invention can be implemented to present and represent any digital information content in any suitable format, e.g., in one or more of audio format, video format, image format, textual format, and any other digital format or format accessible by a computing device. The result indicators 16 thus can represent (e.g., and provide links to) video files, image files, audio files, text files, document files, any other digital files, and combinations thereof. In illustrative embodiments of the present invention, the interactive comparative display 10 is hosted on a website and presented to users in one or more web pages of the website. Accordingly, the result indicators 16 can include links to other web pages (e.g., provided by other websites) that host the online digital content (e.g., video, image, audio, text, etc.) being represented by the result indicators 16. Alternatively or additionally, a user selecting a result indicator 16 can cause the requested information to appear and be presented on the interactive comparative display 10. For example, the result indicators 16 can include movie indicators or television show indicators each representing a movie or television show that can be streamed to the user on the interactive comparative display 10. As yet another example, the result indicators 16 can include game indicators that, when selected by a user, cause a game to be hosted within the interactive comparative display 10 enabling the user to play the selected/requested game.

In general, any suitable computing device can implement the interactive comparative display 10 and the associated methods and functionality described herein, as will be readily appreciated by those of skill in the art. For example, the computing device can include one or more server devices, e.g., logically coupled and in communication with one or more client computing devices. Accordingly, the methods and functionality described herein generally can be implemented as executable instructions contained in one or more non-transitory computer readable storage devices included in the computing device, one or more input devices, one or more output devices, etc., as would be appreciated by one of skill in the art. The interactive comparative display 10 can be presented on one or more output devices (e.g., one or more presentation components), as will be appreciated by one of skill in the art upon reading the present specification.

Figure 7:
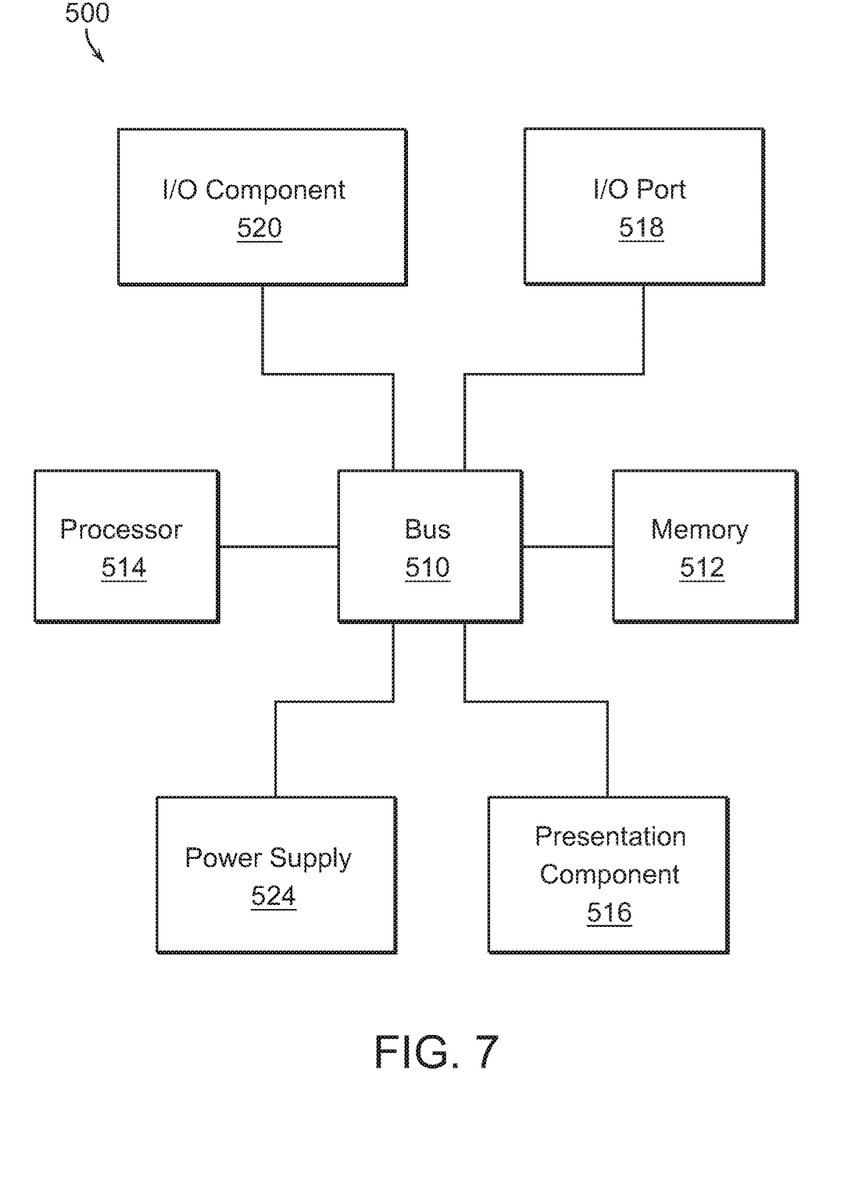
FIG. 7 is a schematic illustration of an example computing device for implementing the interactive comparative display of FIGS. 1 through 6, according to embodiments of the present invention.

For example, FIG. 7 illustrates one example of a computing device 500 for implementing illustrative methods and systems of the present invention. The computing device 500 is merely an illustrative example of a suitable computing environment and in no way limits the scope of the present invention. A "computing device," as represented by FIG. 7, can include a "workstation," a "server," a "laptop," a "desktop," a "hand-held device," a "mobile device," a "tablet computer," or other computing devices, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 524. One of skill in the art will appreciate that the bus 510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 7 is merely illustrative of an exemplary computing device that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 may be removable, non-removable, or any combination thereof. Exemplary hardware devices are devices such as hard drives, solid-state memory, optical-disc drives, and the like. The computing device 500 can include one or more processors that read data from components such as the memory 512, the various I/O components 520, etc.

Presentation component(s) 516 present data indications to a user or other device. Exemplary presentation components include a display device, speaker, printing component, vibrating component, etc.

The I/O ports 518 can allow the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, networking device, and the like.

In illustrative embodiments of the present invention, the interactive comparative display 10 is presented to users on computing devices 500 configured as user devices (e.g., client devices). In such illustrative embodiments, the interactive comparative display 10 is included in one or more web pages hosted by one or more computing devices 500 that are configured as web servers and coupled to the user devices via a communications network (e.g., the Internet, or any other suitable communications network). Accordingly, in some such embodiments where the some or all of the functionality of the interactive comparative display 10 is hosted remotely from the user devices, some or all of the functionality of the interactive comparative display 10 provided by the web servers can be distributed across (e.g., outsourced to) one or more remote/cloud database(s) and/or other remote/cloud computing components or apparatuses, as would be appreciated by one of skill in the art. However, the specific software and/or hardware implementations can be selected depending on the particular intended applications and usages. All such alternative implementations are contemplated within the scope of the present invention.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

The invention claimed is:

1. A computer implemented interactive news display system, the system comprising:
   a processor;
   an interactive comparative display of news information for display on a play device;
   a first plurality of news event indicators displayed by the comparative display of news information and all associated with a first news track, the first plurality of news event indicators comprising:
      a selected news event indicator representing a first news event associated with the first news track;
      at least one selectable news event indicator representing at least a second news event associated with the first news track;
   a first selectable news article link displayed by the comparative display of news information and representing information content that is topically associated with the first news event;
   at least a second selectable news article link displayed by the comparative display of news information and representing information content that differs from the information content represented by the first selectable news article link and is also topically associated with the first news event;
   a display of the comparative display of news information arranged in a visually comparative configuration of the information content represented by the first selectable news article link and the information content represented by the second selectable news article link;
   wherein a selectable related news track indicator is displayed by the comparative display of news information in conjunction with the selected news event indicator, the selectable related news track indicator representing a second plurality of news event indicators all associated with a second news track; and
   wherein selection of the selectable related news track indicator transforms the comparative display of news information into a visually comparative display of news information represented by display of the second plurality of news event indicators arranged in a comparative configuration of the information content represented by each news event indicator of the second plurality of news event indicators.

2. The computer implemented interactive news display system of claim 1, wherein the information content represented by the first selectable news article link is comparable with the information content represented by the second selectable news article link if the information content represented by the first selectable news article link is of a same type of information content but from a different perspective from the information content represented by the second selectable news article link.

3. The computer implemented interactive news display system of claim 1, further comprising more than two selectable news article links each representing information content that is comparable with the information content of each of the other selectable news article links.

4. The computer implemented interactive news display system of claim 1, wherein the information content represented by the first selectable news article link originates from a different source than the information content represented by the second selectable news article link.

5. The computer implemented interactive news display system of claim 1, further comprising one or more user input indicators each presenting input submitted by a user about a selectable news article link of the first selectable news article link and the at least a second selectable news article link.

6. The computer implemented interactive news display system of claim 1, wherein a related news track is displayed in conjunction with the selected news event indicator, the related news track indicator representing a second plurality of news event indicators all associated with a second news track.

7. The computer implemented interactive news display system of claim 6, wherein the second plurality of news event indicators comprises the selected news track indicator.

8. The computer implemented interactive news display system of claim 7, wherein the related news track indicator is selectable, and further wherein selection of the related news track indicator causes display of the second plurality of news event indicators.

9. The computer implemented interactive news display system of claim 7, wherein the related news track indicator is selectable, and further wherein selection of the related news track indicator causes the second plurality of news event indicators to replace the first plurality of news event indicators in the display.

10. The computer implemented interactive news display system of claim 1, wherein the first plurality of news event indicators, the first selectable news article link, and the related news track indicator are all presented in a single display.

11. The computer implemented interactive news display system of claim 1, wherein the first plurality of news event indicators comprise one or more of event indicators, travel information indicators, hotel information indicators, recipe indicators, food indicators, movie indicators, or sports indicators.

12. The computer implemented interactive news display system of claim 1, wherein the first selectable news article link and the at least a second selectable news article link comprise a link pointing to a network location holding the corresponding content information.

13. The computer implemented interactive news display system of claim 1, wherein the information content of the first selectable news article link and the information content of the at least a second selectable news article link are associated with tags.

14. The computer implemented interactive news display system of claim 1, wherein the display further comprises social media tools.

15. The computer implemented interactive news display system of claim 14, wherein the social media tools comprise one or more of comments, ratings, rankings, likes, dislikes, chat, messaging, voting buttons, or polling buttons.

16. The computer implemented interactive news display system of claim 1, further comprising a payment module.

17. The computer implemented interactive news display system of claim 1, further comprising a transaction module.

18. The computer implemented interactive news display system of claim 1, further comprising one or more prediction buttons each presented in conjunction with the first selectable news article link, the at least a second selectable news article link, or a combination thereof.

* * * * *

UNITED STATES PATENT AND TRADEMARK OFFICE
CERTIFICATE OF CORRECTION

PATENT NO. : 10,642,461 B2
APPLICATION NO. : 15/937469
DATED : May 5, 2020
INVENTOR(S) : Drue A. Hontz, Jr.

Page 1 of 1

It is certified that error appears in the above-identified patent and that said Letters Patent is hereby corrected as shown below:

In the Claims

Claim 1, Column 19, Line 61, delete "play" and insert --display--

Signed and Sealed this
Seventh Day of July, 2020

Andrei Iancu
*Director of the United States Patent and Trademark Office*